United States Patent

[11] 3,572,633

| | | |
|---|---|---|
| [72] | Inventor | Donald J. Gaffney<br>Marshalltown, Iowa |
| [21] | Appl. No. | 854,338 |
| [22] | Filed | July 25, 1969 |
| [45] | Patented | Mar. 30, 1971 |
| [73] | Assignee | Fisher Controls Company, Inc. |

[54] ATTACHMENT MEANS FOR VALVE COMPONENTS
6 Claims, 4 Drawing Figs.

[52] U.S. Cl. ..................................... 251/356, 251/88, 251/362
[51] Int. Cl. ..................................... F16k 1/42, F16k 1/48
[50] Field of Search ..................................... 251/357, 362, 88, 334, 356

[56] References Cited
UNITED STATES PATENTS

| 1,979 | 6/1865 | Jenkins | 251/88 |
| 2,088,666 | 8/1937 | Portl | 251/357X |
| 2,143,399 | 1/1939 | Aibercrombie | 137/540 |

FOREIGN PATENTS

| 1,072,855 | 1/1960 | Germany | 251/362 |

*Primary Examiner*—M. Cary Nelson
*Assistant Examiner*—R. B. Rothman
*Attorney*—Molimare, Allegretti, Newitt & Witcoff ABSTRACT: Apparatus for mounting a valve component having a relatively low coefficient of expansion in a high-temperature environment including a retainer and a support member joined to one another to form a holder for holding the valve component securely. An expansion plug having a relatively high coefficient of expansion is between the valve component and the holder to maintain the valve component and holder in desired vibration-free mounted relationship throughout a wide temperature range.

Patented March 30, 1971

3,572,633

INVENTOR.
DONALD J. GAFFNEY

BY
Barry, Freeman & Molinare

ATTORNEYS

ATTACHMENT MEANS FOR VALVE COMPONENTS

BACKGROUND OF THE INVENTION

This invention relates to apparatus for mounting a valve component and more particularly to apparatus for mounting a valve plug or valve seat that is fabricated from corrosion and/or erosion resistant material firmly in a holder for vibration-free operation over a wide temperature range including high temperatures.

Many valve applications require a valve plug tip fabricated from extremely corrosion resistant and/or erosion resistant materials, such as tungsten carbide, chrome carbide or various ceramics. In order to achieve precise fluid control, the valve plug tip is ordinarily affixed to a valve stem that controls its $B$ toward and away from a valve seat within the valve mechanism. Experience has shown that the foregoing types of valve plug tips are extremely difficult to attach to conventional metal valve stems, especially if very high temperatures are involved in the controlled fluid medium.

In the past, some valve plug tips made from the subject materials have been attached to a valve stem by silver brazing. However, silver brazing suffers a loss in strength above approximately 500°F.

Other types of valve plug tips made from chrome carbide or ceramic will not braze or weld satisfactorily, and therefore, must be attached to a metal valve stem by clamping or a shrink-fit process. If a clamping device is used, the tip tends to loosen from the clamping device at high temperatures because the coefficient of expansion of the clamping device and valve tip are generally quite different. A shrink-fit process also has disadvantages. In this process, the parts are heated above the expected operating temperature so they will not loosen during normal usage. As a result, extremely high stresses are sometimes created in the metal parts when they are cooled to room temperature.

Accordingly, it is a primary object of the present invention to provide improved valve mechanism including a holder for mounting a fixture, such as a valve tip or valve seat, the fixture having a relatively low coefficient of expansion as compared with the material from which the holder is fabricated, such holder retaining the components in snug assembled relationship over a wide temperature range of controlled medium within the valve mechanism.

Another object of the present invention is to provide improved valve mechanism including a holder for mounting a valve tip that is designed to operate in the temperature range of 500° F. to 1,200° F.

A further object of this invention is to provide an improved valve mechanism including a holder for mounting a valve seat that is designed to operate in elevated temperature fluid mediums, on the order of 500° F. to 1,200° F.

Another object of the present invention is to provide improved holder for mounting a fixture fabricated from tungsten carbide, chrome carbide, ceramics or the like, such holder having a different coefficient of expansion from the fixture so that the components are tightly assembled over a wide temperature range, including elevated temperatures on the order of 500° F. to 1200° F. Other objects and advantages of the invention will be made more apparent hereinafter.

SUMMARY OF THE INVENTION

In order to overcome the deficiencies of prior constructions and to achieve the foregoing objects, the present invention, in principal aspect, comprises a holder for mounting a fixture having a relatively low coefficient of expansion. The holder comprises a retainer means and a support means that each have a coefficient of expansion greater than the coefficient of expansion of the fixture. An expansion means having a coefficient of expansion greater than the coefficient of expansion of the retainer means is fitted between the holder and the fixture.

The advantages of the present invention are at once apparent. When the fixture and holder comprising the retainer means and support means are heated to a relatively high temperature (e.g. 900° F.) by the controlled fluid medium, the retainer means would normally expand so that a gap would be produced between the fixture and the holder and the fixture would not function as intended to control fluid flow. However, thermal expansion of the expansion means urges the fixture against the holder so that the fixture remains firmly mounted throughout the operating temperature range. As a result, vibration is avoided and the desired functional control of the fixture is assured.

DESCRIPTION OF THE DRAWING

These and other objects, advantages and features of the present invention will hereinafter appear for purposes of illustration, but not of limitation, in connection with the accompanying drawing in which like reference numbers refer to like parts throughout and in which.

DESCRIPTION OF THE PREFERRED EMBODIMENT

Figures 1, 2, 3, 3A:
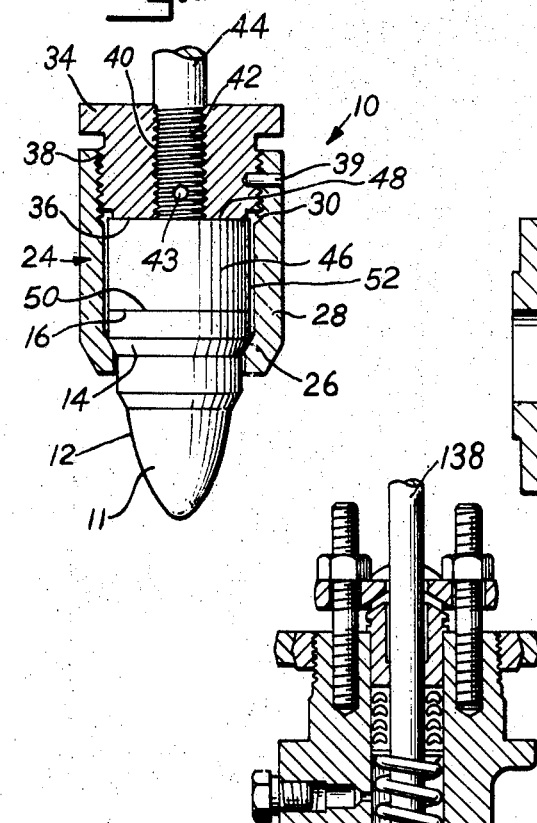
FIG. 1 is a fragmentary, partially cross-sectional, side elevational view of a preferred form of apparatus made in accordance with the present invention that is adapted to hold a valve tip fixture.
FIG. 2 is a fragmentary, side elevational, partially cross-sectional view of a valve employing an alternative form of apparatus made in accordance with the present invention that is adapted to hold a valve tip fixture.
FIG. 3 is a fragmentary, side elevational, partially cross-sectional view of a valve incorporating apparatus made in accordance with the present invention for mounting a valve seat fixture.
FIG. 3A is an enlarged detail view of a portion of the valve mechanism of FIG. 3.

Referring to FIG. 1, there is shown a preferred form of the invention as embodied in a valve plug assembly 10. The valve plug 10 includes a tip 11 having a parabolic exterior surface 12 that meets with a corresponding valve seat (not shown). Valve tip 11 also includes an annular beveled front surface portion 14 and a transverse flat, circular rear surface portion 16. The front and rear surface portions 14 and 16 are joined by a rear body segment 18 cylindrical in cross section.

Valve tip 11 may be made from tungsten carbide or from other corrosion and/or erosion resistant materials, such as chrome carbide or a ceramic material, which generally have low coefficients of expansion. For example, the coefficient of expansion of tungsten carbide is on the order of $3 \times 10^{16}$ inches per inch per degree F.

The valve plug assembly 10 includes a holder for retaining the tip 11 which basically comprises a retainer 24, a support member 34 and an expansion plug 46.

more specifically, retainer 24 comprises a tubular body 28 with a beveled interior surface 26 that normally comates with front surface portion 14 of tip 11 in order to prevent tip 11 from moving downward as viewed in FIG. 1. The hollow retainer body 28 includes interior threads 30 at the rear end portion thereof.

In one present embodiment of the invention, the retainer is fabricated from a steel alloy comprising about 5 percent chromium and about 1.5 percent molybdenum and which will expand about 0.00589 inches per inch when heated to about 900° F.

Support member 34 is generally cylindrically shaped in cross section and comprises a flat, circular mounting surface 36 and external threads 38 on the body portion thereof that comate with internal threads 30 of retainer 24. Retainer 24 and support member 34 are retained together by a pin 39. Defined within support member 34 is a bore 40 in which internal threads 42 are formed.

In the preferred embodiment of the invention shown in FIG. 1, support member 34 is made from a stainless steel which will expand about 0.0054 inches per inch when heated to about 900° F.

A valve stem 44 having an externally threaded end is secured to member 34 by being screwed into internal threads 42 in member 34 and then affixed thereto, as for example, by a pin 43 passing through aligned holes in the support member 34 and the valve stem 44.

Expansion plug 46 is a solid, cylindrically shaped mass, which is disposed within a space or chamber in the holder, formed with a flat, circular rear end surface portion 48 that normally comates with mounting surface 36. The plug 46 also has a flat, circular front end surface 50 that normally comates with rear surface portion 16 of valve tip 11. Outer peripheral surface 52 of plug 46 is displaced from retainer 24 by a slight gap. The expansion plug 46 may comprise a stainless steel material which will expand to about 0.00844 inches per inch when heated to about 900° F.

If valve tip 11, retainer 24, support member 34 and expansion plug 46 are arranged as shown in FIG. 1 at room temperature, the valve tip is securely held between beveled surface 26 of retainer 24 and front end surface 50 of expansion plug 46. When the elements of valve plug assembly 10 are subjected to a relatively high operating temperature (e.g., 900° F.), the retainer 24 tends to elongate at a faster rate than the valve tip 11 due to the difference in their coefficients of expansion. As a result, surface 26 would tend to move away from the front surface portion 14 so that the valve tip would become loose within its holder. If this condition were allowed to continue, the vale plug assembly 10 would rapidly fail from vibration caused by the movement and pressure of the controlled medium flowing thereover. In order to retain the valve tip 11 in a securely mounted condition within the holder throughout a large operating temperature range, expansion plug 46 is fabricated from a material having a coefficient of expansion greater than the coefficient of expansion of either the retainer or support member. The length of the expansion plug is then calculated so that it will urge the valve tip against the beveled surface of the retainer of the holder throughout a desired operating range of temperatures.

A second embodiment of the invention adapted for use in connection with a valve tip 11 is described in FIG. 2. As shown therein, the second embodiment of the invention basically comprises holder means including a retainer 24a, a support member 34a, and an expansion plug 46a. The components shown in FIG. 2 are closely analogous to the components bearing like numerals that are shown in FIG. 1, and are fabricated from the same materials. Accordingly, the embodiment shown in FIG. 2 may be understood by those skilled in the art with reference to the discussion of the FIG. 1 embodiment. One noteworthy difference between the FIG. 1 and FIG. 2 embodiments is that the support member 34a comprises a generally hollow cylindrical extension 35a that partially surrounds expansion plug 46a and closely adjoins the rear surface portion 16a of valve tip 11.

As in the case of the FIG. 1 embodiment, expansion plug 46a thermally expands at the operating temperature of the fluid medium (e.g., 900° F.) in order to urge tip 11a against retainer 24a. Of course, in order to achieve the foregoing mode of operation, plug 46a must have an appropriate length. If the coefficients of expansion of retainer 24a, support member 34a, expansion plug 46a, and valve tip 10a are represented by the letters $C$, $D$, $E$ and $F$, respectively, the length of expansion plug 46a may be calculated from the following equation:

$$(C \times A) + (D \times B) = (E \times B) + (F \times A)$$

wherein the letters $A$ and $B$ represent lengths defined as follows:

The letter $A$ represents the distance indicated in FIG. 2, that is, the distance from the point of contact between surface 14a and retainer 24a to the rear surface portion 16a of tip 11a. The letter $B$ in the equation represents the distance indicated in FIG. 2, that is, the length of the expansion plug 46a. Because expansion rates vary from one temperature to another, it is necessary to calculate the relative expansions at various temperatures less than the operating temperature to make sure that plug 46a does not overexpand, thereby placing too much stress on retainer 24a. The post and retainer are made of materials of substantially the same coefficient of expansion and for purposes of the above formula are considered to be the same.

The embodiment shown in FIG. 2 is illustrated in connection with an exemplary valve mechanism 60 comprising a body 62 having an inlet 64 and outlet 66. The inlet and outlet are connected by a passage 65 having therein a valve seat 68. The valve seat 68 is secured in place by valve seat retainer 69. The retainer 24a, support member 34a and a valve stem 44a are guided and restrained by a hollow valve guide 70. The valve mechanism operates in a well-known manner to control the flow of fluid from the inlet to the outlet by altering the relative position of valve tip 11a relative to the valve seat 68.

Referring to FIG. 3, there is shown a further embodiment of the invention, which is illustrated in connection with an exemplary valve mechanism 124. The valve mechanism comprises a body 126 that defines an inlet 128 communicated to an outlet 130 by an internal passage 129.

Valve seat, which is in a wall within the valve body 126, cooperates with a valve tip 132 comprising a beveled surface 134 that comates with seat surface 82 of valve seat fixture 80. Valve tip 132 includes a plug portion 136 that fits into bore 85 of body 84. The valve tip 132 is connected by conventional means to a valve stem 138 that is operated, in part, by a conventional actuator, as for example, a pneumatic operator. Conventional packing means are provided about stem 138 to seal between the stem and bonnet 142 of the valve body 126. The valve seat fixture 80 and valve tip 132 operate in a well-known manner to control the flow of fluid between the inlet and the outlet.

FIG. 3A shows the valve seat fixture of FIG. 3 on an enlarged scale. The valve seat fixture 80 comprises a valve seat adapted to be retained in a holder means 90. More specifically, fixture 80 comprises a seat surface 82, and a substantially cylindrical body 84 that defines a bore 85. Fixture 80 has a lip portion 86 that defines a front surface portion 87 and a rear surface portion 88. Fixture 80 may be fabricated from a variety of corrosion or erosion resistant materials such as tungsten carbide, chrome carbide or ceramic material.

The holder means 90 basically comprises a retainer 92, a support member 102 and an expansion member 112.

More specifically, retainer 92 comprises a generally tubular body having an inwardly turned angle portion 94 that has a rear surface 96 abutting front surface portion 87 of fixture 80. Formed on retainer 92 are interior threads 98 and exterior threads 99.

Support member 102 includes a tubular body having a mounting surface 104 and external threads 106 that comate with internal threads 98 of retainer 92. Support member 102 also comprises a cylindrical inner surface 108 that is located adjacent valve seat fixture 80.

Expansion member 112 basically comprises a hollow, annular mass having a rear end surface 114 that is normally in contact with mounting surface 104, and a front end surface 116 that is normally in contact with rear surface portion 88 of fixture 80. Expansion member 112 also includes an outer surface 118 that normally has a clearance fit with the inner wall of the retainer 92, and an inner surface 120 that adjoins fixture 80.

Retainer 92, support member 102 and expansion member 112 may be fabricated from the same materials used in retainer 24, support member 34 and expansion plug 46, respectively.

The manner of operation of the third embodiment of the invention is at once apparent from the illustration in FIG. 3a. In valve mechanisms for controlling high-temperature fluids, on the order of 900° F., if the retainer and support member alone were used to mount the lip portion of the valve seat fixture, the differential expansion rates of the parts would quickly loosen the fixture and allow damaging vibrations to occur.

However, by properly choosing the size and material from which expansion member 112 is made, the differences in the expansion rates of the parts may be compensated, so that the valve seat fixture remains securely mounted in the holder throughout a wide temperature range.

Those skilled in the art will recognize that the particular structures and modes of operation described herein may be altered and changed without departing from the spirit and scope of the invention.

I claim:

1. In a valve mechanism comprising a valve body having an inlet and an outlet communicated to one another by a passage, and cooperating valve means, which includes a valve component, in said passage to control fluid flow through the valve body, the fluid being at elevated temperatures, the improvement characterized by said valve means including holder means for retaining the valve component in a vibration-free manner over a predetermined temperature range, including elevated temperatures on the order of 500° F., and above, said holder means including retainer means, support means and expansion means, said retainer and said support means each having a coefficient of expansion greater than the coefficient of expansion of said valve component, said retainer means bearing against a first portion of said valve component for preventing the valve component from moving in a predetermined direction, said support means being connected to the retainer means and cooperating therewith to define a space for receiving the valve component and the expansion means, said support means having a mounting surface thereon, the expansion means having a coefficient of expansion greater than the coefficient of expansion of the retainer means or support means, said expansion means having a first portion bearing against said mounting surface and a second portion bearing against said valve component, whereby the thermal expansion of the expansion means maintains said first portion of the valve component with contact with the retainer means so that the valve component is maintained in a vibration-free manner throughout a predetermined temperature range.

2. A valve mechanism as in claim 1 wherein said valve component comprises a valve tip.

3. A valve mechanism as in claim 1 wherein said valve component comprises a valve seat.

4. A valve mechanism as in claim 1 wherein said expansion means and support means are made from stainless steel and said retainer means is made from a steel alloy comprising chromium and molybdenum.

5. A valve mechanism as in claim 1, wherein the valve component is made from material selected from the group consisting of tungsten carbide, chrome carbide and ceramic.

6. A valve mechanism as in claim 1 wherein the length of the expansion means is preselected to accommodate different expansions of the valve component and holder means, dependent upon the materials from which the valve component and holder means are fabricated.